(12) United States Patent
Ferlin et al.

(10) Patent No.: US 6,478,859 B1
(45) Date of Patent: Nov. 12, 2002

(54) AIRBORNE PARTICULATE REMOVAL APPARATUS

(76) Inventors: Keith A. Ferlin, 6302 Peach Orchard Road, Summerland, British Columbia (CA), V0H 1Z0; Earl Holland, 3118 N. 110$^{th}$St., Kansas City, KS (US) 66109; Clint Price, 4880 Bolean Drive, Kamloops, British Columbia (CA); James Wymer, 185 Beverly Place, Kamloops, British Columbia (CA)

( * ) Notice: Subject to any disclaimer, the term of this patent is extended or adjusted under 35 U.S.C. 154(b) by 39 days.

(21) Appl. No.: 09/706,324

(22) Filed: Nov. 3, 2000

(51) Int. Cl.$^7$ ................................................ B01D 47/06
(52) U.S. Cl. .............................. 96/236; 96/297; 96/363
(58) Field of Search ........................... 55/423; 95/199, 95/27, 214, 224; 96/296, 297, 361, 363, 364, 236

(56) References Cited

U.S. PATENT DOCUMENTS

| | | | |
|---|---|---|---|
| 1,222,541 A | * | 4/1917 | Donham |
| 1,620,780 A | * | 3/1927 | Pease |
| 1,813,692 A | * | 7/1931 | Anderson |
| 1,966,280 A | * | 7/1934 | Bingham |

(List continued on next page.)

FOREIGN PATENT DOCUMENTS

| | | |
|---|---|---|
| CA | 1049923 | 3/1979 |
| CA | 1064392 | 10/1979 |
| CA | 1065756 | 11/1979 |
| CA | 1084409 | 8/1980 |
| CA | 1091144 | 12/1980 |
| CA | 1106777 | 8/1981 |
| CA | 1135179 | 11/1982 |
| CA | 1189786 | 7/1985 |
| CA | 1225015 | 8/1987 |
| CA | 2136221 | 11/1993 |
| CA | 2202254 | 5/1996 |
| CA | 2135437 | 4/1999 |

*Primary Examiner*—Duane S. Smith
(74) *Attorney, Agent, or Firm*—John S. Reid; Antony C. Edwards (57) ABSTRACT

In summary a device for removing airborne particulate of the present invention includes at least one chamber having an airstream inlet at an upstream end and an airstream outlet at a downstream end, an air mover cooperating with the at least one chamber so as to urge an airborne particulate laden airstream into the at least one chamber through the inlet, along a flow path through the at least one chamber, and out of the at least one chamber through the outlet, at least one water sprayer mounted to the at least one chamber for mixing a spray of water with the airstream in the flow path, at least one slurry collecting element mounted entirely across and in the flow path so as to seal across the chamber to prevent bypass of the airstream around the collecting element, the collecting element downstream of the water sprayer, the at least one slurry collecting element including at least one array of slurry collecting members mounted so as to pass at least a portion of the airstream through the array, the at least one chamber having a slurry remover therein for removing from the at least one chamber slurry collected by the at least one slurry collecting element.

40 Claims, 6 Drawing Sheets

U.S. PATENT DOCUMENTS

| | | | | |
|---|---|---|---|---|
| 2,143,979 A | * | 1/1939 | Feinberg |
| 2,199,632 A | | 5/1940 | Keyes |
| 2,360,669 A | * | 10/1944 | Goethel |
| 2,513,174 A | * | 6/1950 | Hess |
| 3,036,417 A | | 5/1962 | Mare et al. |
| 3,325,973 A | * | 6/1967 | Illingworth |
| 3,559,379 A | * | 2/1971 | Lambert |
| 3,659,402 A | | 5/1972 | Alliger |
| 3,675,393 A | | 7/1972 | Meade |
| 3,726,062 A | | 4/1973 | Hungate et al. |
| 3,733,778 A | | 5/1973 | Hungate et al. |
| 3,748,828 A | | 7/1973 | Lefebvre |
| 3,763,634 A | | 10/1973 | Alliger |
| 3,768,234 A | | 10/1973 | Hardison |
| 3,785,127 A | * | 1/1974 | Mare |
| 3,795,089 A | * | 3/1974 | Reither |
| 4,049,399 A | * | 9/1977 | Teller |
| 4,290,783 A | * | 9/1981 | Adams et al. |
| 4,380,353 A | | 4/1983 | Campbell et al. |
| 4,397,662 A | * | 8/1983 | Bloomer |
| 4,411,846 A | | 10/1983 | Ulrich et al. |
| 4,437,867 A | | 3/1984 | Lerner |
| 4,604,108 A | * | 8/1986 | Cotton, Jr. |
| 4,787,920 A | | 11/1988 | Richard |
| 4,938,787 A | | 7/1990 | Ewald-Wilhelm et al. |
| 4,954,148 A | * | 9/1990 | Alexander, Sr. |
| 5,145,236 A | | 9/1992 | Liao et al. |
| 5,200,055 A | * | 4/1993 | Zitko |
| 5,253,925 A | | 10/1993 | Modzik, Jr. |
| 5,300,131 A | | 4/1994 | Richard |
| 5,313,744 A | | 5/1994 | Shank, Jr. |
| 5,484,471 A | | 1/1996 | Schwab |
| 5,683,476 A | | 11/1997 | Divers |
| 5,713,970 A | | 2/1998 | Raring |
| 5,759,233 A | | 6/1998 | Schwab |
| 5,803,955 A | | 9/1998 | Raring |
| 5,866,000 A | | 2/1999 | Yeh |
| 5,879,434 A | * | 3/1999 | Kiss |
| 6,059,866 A | | 5/2000 | Yamagata et al. |
| 6,126,729 A | | 10/2000 | Smith |

* cited by examiner

AIRBORNE PARTICULATE REMOVAL APPARATUS

FIELD OF THE INVENTION

This invention relates to an apparatus for removing airborne particulate, including dust, from an airstrean.

BACKGROUND OF THE INVENTION

This invention has particular application in cleaning the contaminated air being drawn from gritblasting operations in preparation of thermal coating in a coal fired boiler. The invention may also be applied to provide air cleaning for grit blasting operations in preparation for spray painting and to remove paint particulate from the contaminated airstream. The invention may also be used for cleaning the air from such operations in vessels aid structural steel as defined below.

The term boiler is used herein to include, without limiting, boilers fired with diesel or wood waste and chemical recovery boilers. The term vessel is used herein, without limiting, to include storage tanks, continuous or batch digesters, refining columns and the hulls or interiors of ships. The term structural steel is used herein to include, without limiting, supporting steel for boilers, supporting steel for vessels, bridges, and control gates for dams.

In the past, cleaning of contaminated air in such applications has been achieved by large electric driven or engine driven fans drawing the air through cyclones, a series of filters, or a combination of both. These "dust collectors" as they are referred to in the industry are large and heavy and usually mounted on large trucks or flatbed trailers and quite often cannot be located adjacent to the worksite, thus requiring the use of long lengths of pipe or flexible ducting to transport the contaminated air, They may have self-cleaning filters or bags. Over time the filters or bags have to be replaced.

SUMMARY OF THE INVENTION

Accordingly, it is an object of the present invention to at least partially overcome the disadvantages of the prior art by providing apparatus for particulate removal adjacent to one or more selected work sites and to provide for sizing the apparatus to correspond to the scope of work being performed.

To this end, in one of its aspects, the invention provides the ability to locate the apparatus adjacent to a selected worksite. This is facilitated by the apparatus being relatively lightweight, portable, modular and consequently, its ability to be relative quickly assembled at the worksite. The components may be adapted for transport in a freight or personnel elevator such as commonly employed in industrial plants. The apparatus can also be sized to accommodate a small worksite or plurality of worksites.

The apparatus includes in one embodiment, elements constructed of panels of plastic grid and mesh held together in a "C" channel around the perimeter of the panels. Water manifolds having substantially the same outer dimensions as the elements are provided for mounting upstream of each element. The manifolds have orifices pointing generally inwards in the plane of the manifold frame. The water manifold is hollow so as to form a manifold supplying water to the orifices. The orifices are sized to create a mist or spray.

A plurality of elements and manifolds are mounted in at least one chamber, so as to extend laterally from each side and from top to bottom of the chamber thus preventing airflow bypassing around the elements. The contaminated airstream is thereby forced or drawn through the chamber through the elements and manifolds. The chamber or a plurality of interconnected chambers may be mounted on, so as to be supported by, a system scaffold, such as the Layher-type scaffold. In each chamber, as the particulate laden airstream passes through the manifold, water droplets in the mist or spray from the manifold may adhere to the airborne particulate and then either fall into a collection hopper, or otherwise be mixed into, so as to mingle with and be carried by the airstream. As the mist in the airstream passes through the corresponding element some or many of the particulate laden water droplets contact and adhere to the surfaces of the array of grids or mesh in the elements. The water droplets coalesce on the surfaces of the grids or mesh until blown or drawn by gravity from the grids or mesh so as to fall into the hopper. In this manner particulate are removed from the airstream, Solid panels form sides, ends and top of each chamber. The floor of each chamber may be formed as a collection hopper or funnel or catch-trough or the like for collecting the slurry of water and particulate. In one embodiment, the hopper directs the slurry to a drain. A drain line may take the slurry from the drain to a settling tank. Tie tank may leave a plurality of weirs to promote settling out of the sediment. A submersible pump may be located in the downstream-most settling compartment to pump the water back into the manifolds so as to recirculate and reuse the water. This is useful, as the system is intended to be temporary and as it lends to the portability of the system so as to operate more unintrusively in a plant and eliminates the need to dump large quantities of water or slurry, The power source may be a pneumatic, i.e. air powered, air mover such as an air reaction fan, or other in-line air moving or other air motivating means, which is relatively compact, lightweight and capable of moving relatively large volumes of air. Air reaction fans are well adapted because they may be shock-proof in wet conditions and safe in volatile atmospheres when properly grounded.

The contaminated air is drawn into the chambers through an inlet on the upstream end of the first, i.e. upstream, chamber. The airstream then passes through a plurality of elements in each chamber, although a plurality of chambers may not be required depending on the demands of the specific application, Each element is mounted in the chamber so as to seat across the chamber to prevent airflow bypassing the element. Otherwise it has been found that an airflow bypass reduces the efficiency of slurry extraction. Each element has a corresponding water sprayer such as a perforated manifold mounted adjacent or to the upstream side of the element. A space is provided between elements for example when the elements are mounted at either end of a chamber at the edges of the hopper. Adjacent chambers are connected by, for example, a short duet. The second or additional chambers may have the same dimensions as the first chamber and contain the same plurality and arrangement of elements and corresponding water sprayers or manifolds. The air mover as described above may be mounted at the downstream end of the second or downstream-most chamber. The air mover may be mounted on the end panel or on the roof of the downstream chamber to suit the particular application. A smooth duct mounted to the air mover carries the moisture laden air to a remote exhaust location where it will not affect other worksites.

In the upstream chamber, the upstream element or element and manifold pair may be inclined downstream so as to leave the root or base of the element against the edge of the hopper, thereby providing an airspace or gap between the inlet and that element. This allows the airstream to better mix and more uniformly spread out into the chamber before impinging the first or upstream grids or mesh in the upstream element. This spreading introduces a more uniform flow rate across the face of the element and a more uniform flow rate through the entire area of the element to optimize the efficiency of coalescing of the slurry on the grid or mesh members. Inclining the element also increases the apparent surface area of the grids or mesh as the airflow impinges the grids or mesh at an angle. The downstream-most element may be inclined upstream from a base edge in contact with the downstream edge of the corresponding hopper.

In summary a device for removing airborne particulate of the present invention includes at least one chamber having an airstream inlet at an upstream end and an airstream outlet at a downstream end, an air mover cooperating with the at least one chamber so as to urge an airborne particulate laden airstream into the at least one chamber through the inlet, along a flow path through the at least one chamber, and out of the at least one chamber through the outlet, at least one water sprayer mounted to the at least one chamber for mixing a spray of water with the airstream in the flow path, at least one slurry collecting element mounted entirely across and in the flow path so as to seal across the chamber to prevent bypass of the airstream around the collecting element, the collecting element downstream of the water sprayer, the at least one slurry collecting element including at least one array of slurry collecting members mounted so as to pass at least a portion of the airstream through the array, the at least one chamber having a slurry remover therein for removing from the at least one chamber slurry collected by the at least one slurry collecting element.

The, at least one, array may be a lattice including at least one grid.

The, at least one, rigid grid may be at least two parallel adjacent rigid grids. An upstream-most collecting element may be inclined relative to the airstream.

The, at least two, parallel adjacent rigid grids may be offset relative to one another so as to reduce in size an effective grid spacing in the flow path. The offset may be substantially one-half of a grid spacing of one of the at least two parallel adjacent rigid grids.

The water may be recirculated from the slurry remover to the at least one water sprayer.

The lattice may further include a mesh mounted parallel to the at least one rigid grid.

The water sprayer may include a water manifold extending at least partially around the at least one chamber. The water manifold may be a water conduit mounted around an interior perimeter, substantially lateral cross-section of the at least one chamber, the conduit having orifices in spaced array therearound directed into the flow path. The manifold may be mounted within the at least one chamber. The manifold may be mounted adjacent and parallel to the at least one lattice of slurry collecting members.

The inlet may be an airstream diffuser so as to slow the airstream upstream of the at least one water sprayer. The, at least one, water sprayer may be spaced apart from the inlet so as to allow the airstream to slow m the at least one chamber upstream of the at least one water sprayer.

BRIEF DESCRIPTION OF THE DRAWINGS

FIG. 6 is a perspective view of one embodiment of the chambers of FIG. 1, with their top panels and water supply hoses removed from clarity, and the settling tank of FIG. 5.

DETAILED DESCRIPTION OF PREFERRED EMBODIMENTS

FIG. 1 illustrates a chamber 10 having an inlet 12 mounted on a front wall 14 of the chamber. In one embodiment, and without intending to be limiting, the area of the front wall is not substantially less than approximately five times the area of the initial inlet area 12*a* of inlet 12 and not substantially less than approximately twice the area of the outlet area of the inlet. Front wall 14 may be square and may have dimensions of 4 feet on each side. The outlet of inlet 12 may also be square and may have dimensions of 3 feet on each side. The diameter of inlet area 12*a* may be 2 feet.

As also seen in FIG. 5, inlet 12 is formed as a diffuser, so that the combined effect of the inlet and the first space 16 between front wall 14 and first water manifold 18 is to allow a rapid deceleration and expansion of a particulate laden airstream entering inlet 12 in direction A. The diffuser may, as seen in FIG. 1*a,* have internal vanes 13 for turning the airflow to thereby help to uniformly distribute the airflow across the lateral cross section of the chamber. Water manifold 18 has orifices 20 as better seen in FIG. 2 which may be equally spaced along the inside perimeter 18*a* of water manifold 18. Manifold 18 may be made of non-corroding material or have a non-corroding surface coating. The orifices may be formed for example as 1⁄16 inch holes.

The manifold is mounted on the upstream side of each element. The manifold and slurry collecting element 22 are sized so as to extend completely laterally and vertically across the interior of the chamber. They may be mounted to the sidewalls 24 of the chamber and to the roof of the chamber. They may seal the chamber by extending to the floor or edges of the hopper.

As seen in FIG. 3, element 22 is encased around its perimeter in a “C” channel 26, that is, a channel having substantially a “C” shape in cross-section. The lowermost surface of channel 26 is open or perforating or otherwise adapted to allow moisture accumulating on the grids or mesh mounted therein as better described below, to flow out of the channel. Channel 26 encases three adjacent parallel layers sandwiched within the channel. Again, the layers may be of a non-corroding material or having non-corroding coating. The first layer may be a mesh 28. The mesh is the upstream layer and may have 3⁄16 inch mesh openings, or for example openings generally in the range of ¼–¾ inch. Mesh 28 may be expanded or flat rolled metal mesh. Mesh 28 may provide an approximate 30–40 percent obstruction in the flow.

The second and third layers may be overlayed grids 30 and 32. Grids 30 and 32 may each have the same grid size, that is, tie openings between the grid members are uniform across each grid and the same for each grid. For example, grids 30 and 32 may each have ¾ inch square grid openings. However, grids 30 and 32 are offset both vertically and laterally in their parallel planes by an amount equal to ½ of one grid opening, that is, offset relative to one another by a distance equal to ½ of the distance between individual grid members (equating to ⅜ inch in the example given) so that the apparent grid aperture size to the particulate moisture laden airstream passing through mesh 28 and grids 30 and 32 is ¼ that of the size of the grid opening for each individual grid (equating to 3/16 inch square in the example). This increases the probability of water droplets containing particulate impinging a grid member so as to adhere thereto. Once water droplets start accumulating on the grid members, and for that matter on mesh 28, the droplets may then coalesce so as to form a stream or otherwise a constant or intermittent flow of particulate laden water, also referred to herein as a slurry, flowing downwardly under the force of gravity into a catch basin or hopper 34.

The particulate laden airstream continues in direction A longitudinally downstream along chamber 10 so as to pass through a plurality of alternating water manifolds 18 and elements 22. The manifold and element pairs may, for example, be mounted at either end of each chamber, and the upstream-most pair inclined from vertical, for example between vertical and 45 degrees. Depending on the quantity of airborne particulate in the airstream, and the volumetric flow rate of the airstream, in other words depending on the particular application, the number of manifolds 18 and elements 22 in the plurality of such pairs spaced apart within the chamber, will vary. Although illustrated as two pairs of manifolds and elements per chamber, this is not intended to be limiting. Nor is the present invention intended to be limited to one or a plurality of chambers. The particular application, including such factors as airborne particulate density, available installation space, and the like will dictate the number of filters and chambers. Increasing the number of water manifold and element pairs increases the capacity for removing particulate from the airstream, but also correspondingly increases the flow rate of water draining from hopper 34 through drain 36 to be recirculated to the water manifolds from the settling tank.

As illustrated in FIG. 4, the downstream end wall 38 of tile downstream-most chamber 10 may have an air mover such as an air reaction fan 40 mounted thereto so as to drawn air through a corresponding aperture in the end wall. A compressed air line 42 may supply compressed air to air reaction fan 40. Air reaction fan 40 draws the airstream commencing in direction A through inlet 12 downstream along the longitudinal length of however many chambers 10 are linked end to end, such linkage for example by a duct 44. Moisture laden air drawn from the downstream-most end of the downstream-most chamber 10 by air reaction fan 40 is exhausted through a smooth bored duct 46.

What is not illustrated is the various supporting frames employed to support chambers 10 and the various ducts, and the air reaction fan. The use of a Layher-type of scaffold may dictate that duct 44 have a slightly smaller, that is a few inches or so, diameter in lateral cross-section. Elements may be mounted on the immediate upstream and downstream sides of the duct.

As seen in FIGS. 5 and 6, slurry draining through drain 36 flows through drain line 48 into settling tank 50. Stepped weirs 52 separate adjacent setting compartments within settling tank 50. The downstream-most settling tank may have a submersible pump 54 mounted therein for pumping water along return line 56, through feed lines 56', back into the water manifolds 18 so as to recirculate the water.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for removing airborne particulate comprising:

at least one chamber having an airstream inlet at an upstream end and an airstream outlet at a downstream end, an air mover cooperating with said at least one chamber so as to urge an airborne particulate laden airstream into said at least one chamber through said inlet, in a flow direction along a flow path through said at least one chamber, and out of said at least one chamber through said outlet, at least one water sprayer mounted to said at least one chamber for mixing a spray of water with said airstream in said flow path, at least one slurry collecting element mounted entirely across and in said flow path so as to seal across said chamber to prevent bypass of said airstream around said collecting element, said collecting element downstream of said water sprayer, said at least one slurry collecting element including at least two separate parallel and adjacent rigid grids, offset relative to one another to overlap grid spacings of said grids so as to reduce in size but not close off an effective grid opening spacing normal to said flow direction in said flow path, said at least one chamber having a slurry remover therein for removing from said at least one chamber slurry collected by said at least one slur collecting element.

2. The device of claim 1 wherein an upstream-most collecting element is inclined relative to said airstream.

3. The device of claim 1 wherein said offset is substantially one-half of a grid spacing of one of said at least two parallel adjacent rigid grids.

4. The device of claim 1 wherein said water is recirculated from said slurry remover to said at least one water sprayer.

5. The device of claim 1 wherein said lattice further includes a mesh mounted parallel to said at least one rigid grid.

6. The device of claim 1 wherein said water sprayer includes a water manifold extending at least partially around said at least one chamber.

7. The device of claim 6 wherein said water manifold is a water conduit mounted around an interior perimeter, substantially lateral cross-section of said at least one chamber, said conduit having orifices in spaced array therearound directed into said flow path.

8. The device of claim 7 wherein said manifold is mounted within said at least one chamber.

9. The device of claim 8 wherein said manifold is mounted adjacent and parallel to said at least one lattice of slurry collecting members.

10. The device of claim 9 wherein said at least one array is a lattice including at least one rigid grid.

11. The device of claim 10 wherein said at least one rigid grid is at least two parallel adjacent rigid grids.

12. The device of claim 11 wherein said at least two parallel adjacent rigid grids are offset relative to one another so as to reduce in size an effective grid spacing in said flow path.

13. The device of claim 12 wherein said offset is substantially one-half of a grid spacing of one of said at least two parallel adjacent rigid grids.

14. The device of claim 9 wherein said at least one array includes a mesh.

15. The device of claim 10 wherein said lattice further includes a mesh mounted parallel to said at least one rigid grid.

Figure 1:
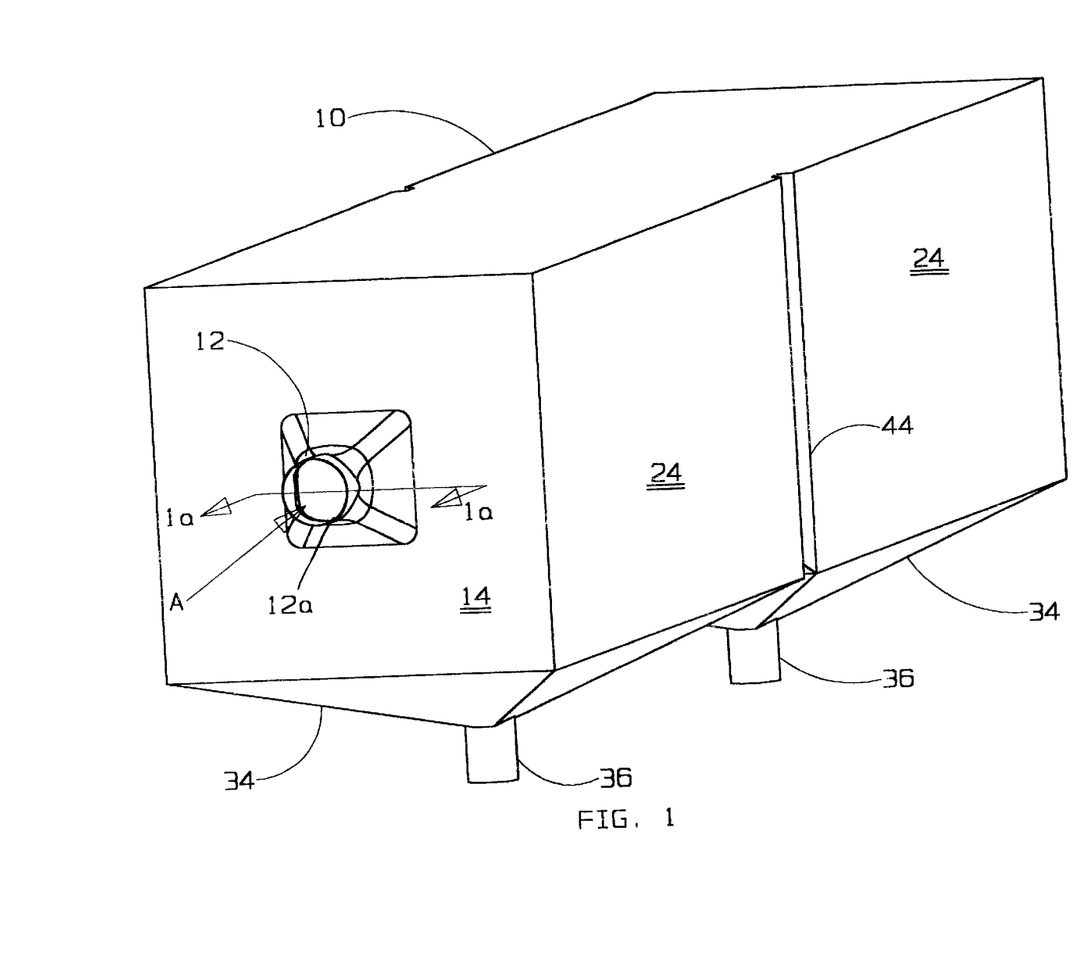
FIG. 1 is an isometric view of two interconnected chambers according to the present invention.
Figure 1A:
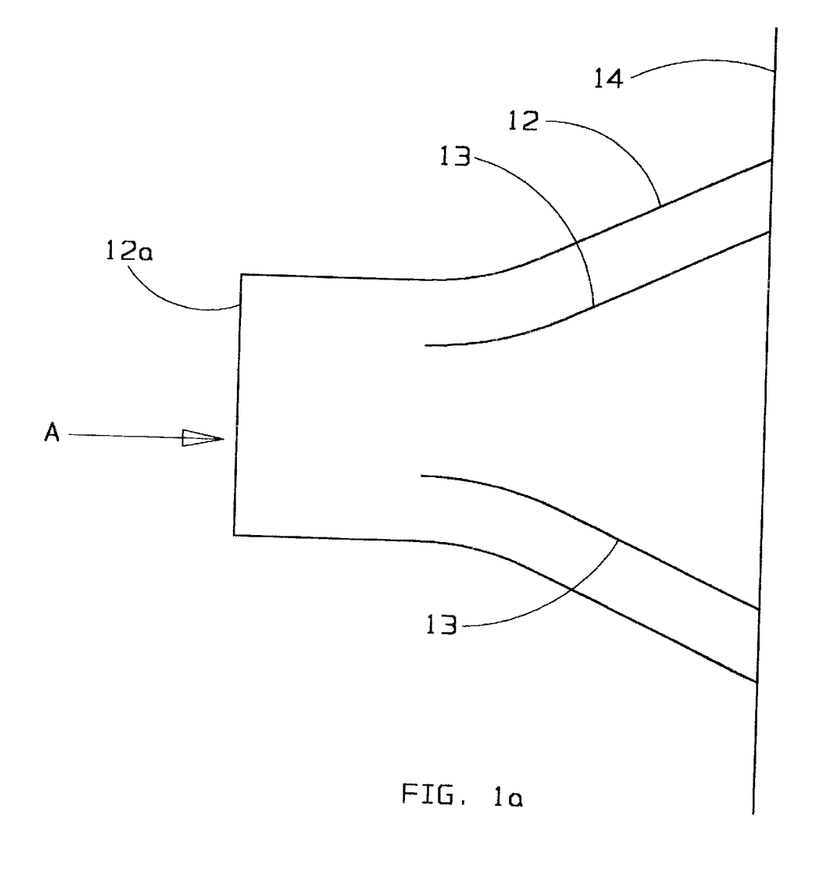
FIG. 1a is a sectional view along lines 1a—1a in FIG. 1.
Figure 2:
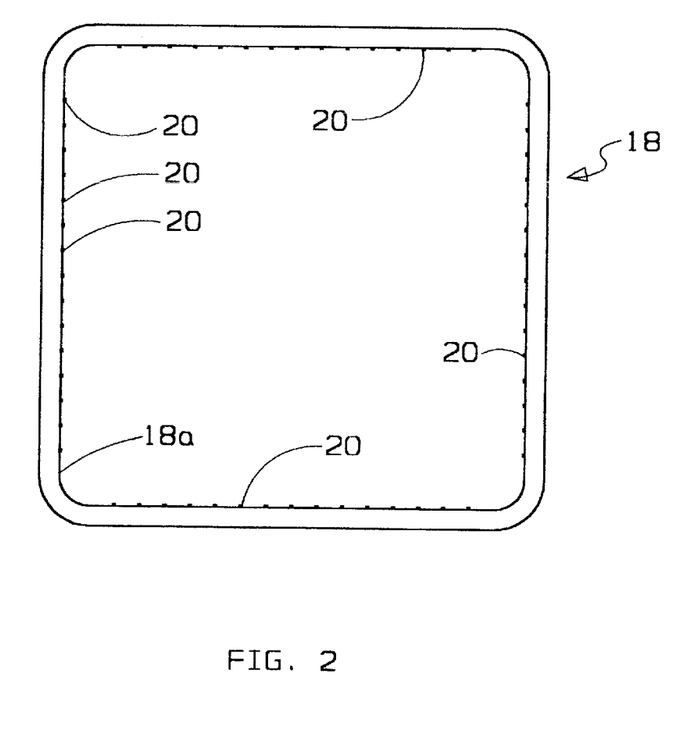
FIG. 2 is a front elevation of a water manifold.
Figure 3:
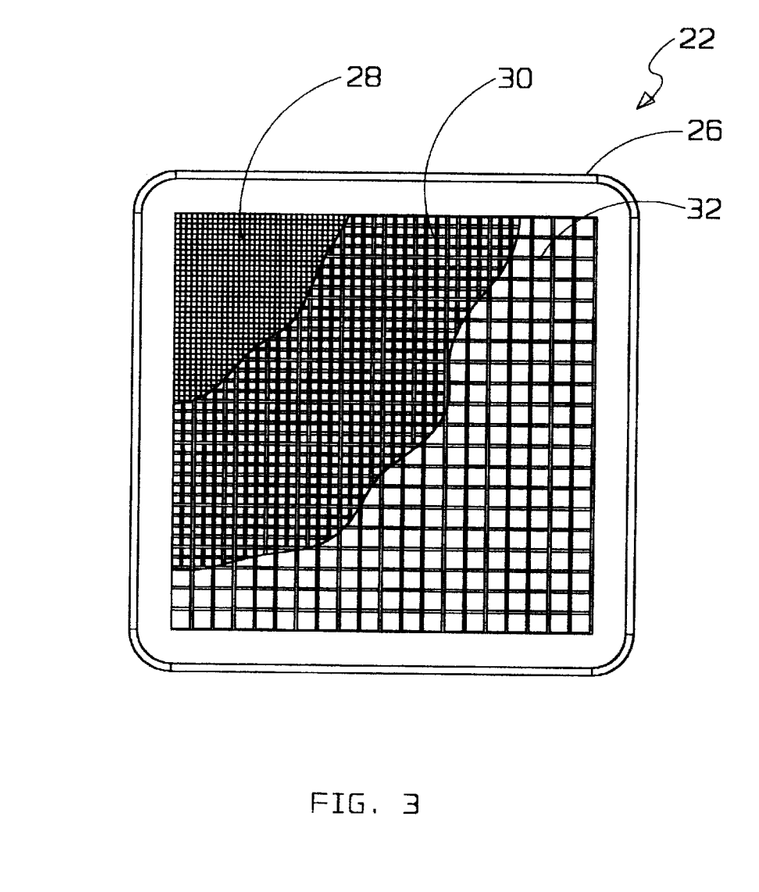
FIG. 3 is a partially cut-away front elevation of one element.
Figure 4:
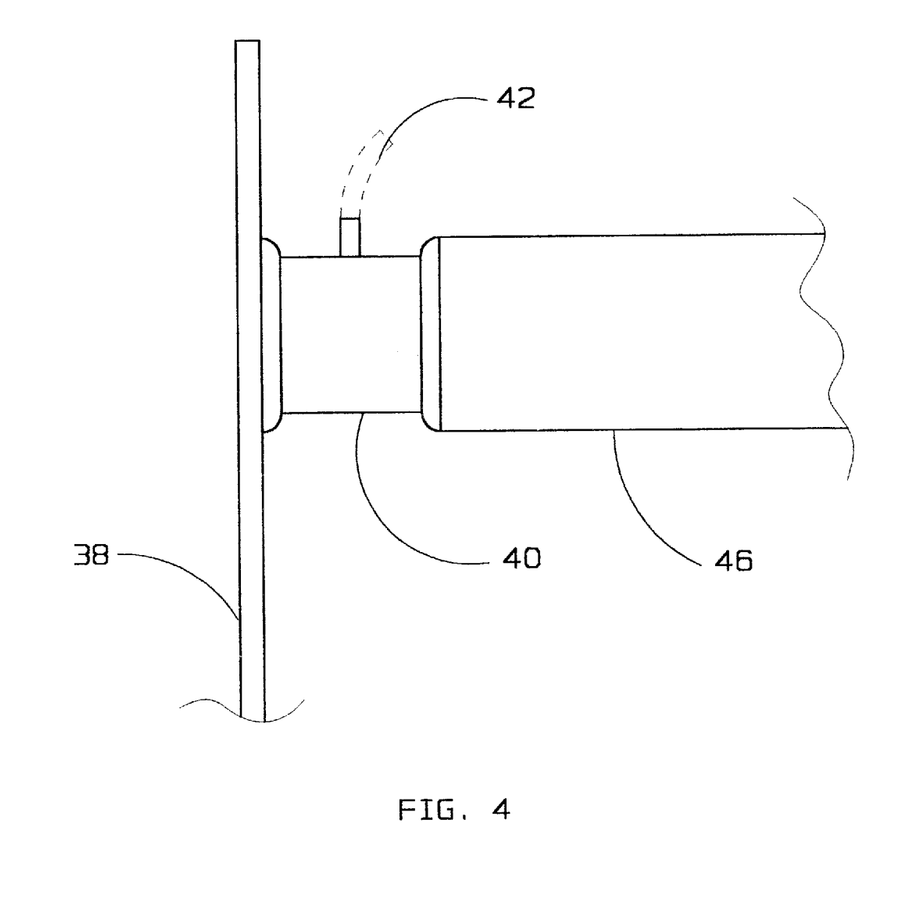
FIG. 4 is a side elevation of the end wall of a downstream chamber and the air reaction fan mounted to it.
Figure 5:
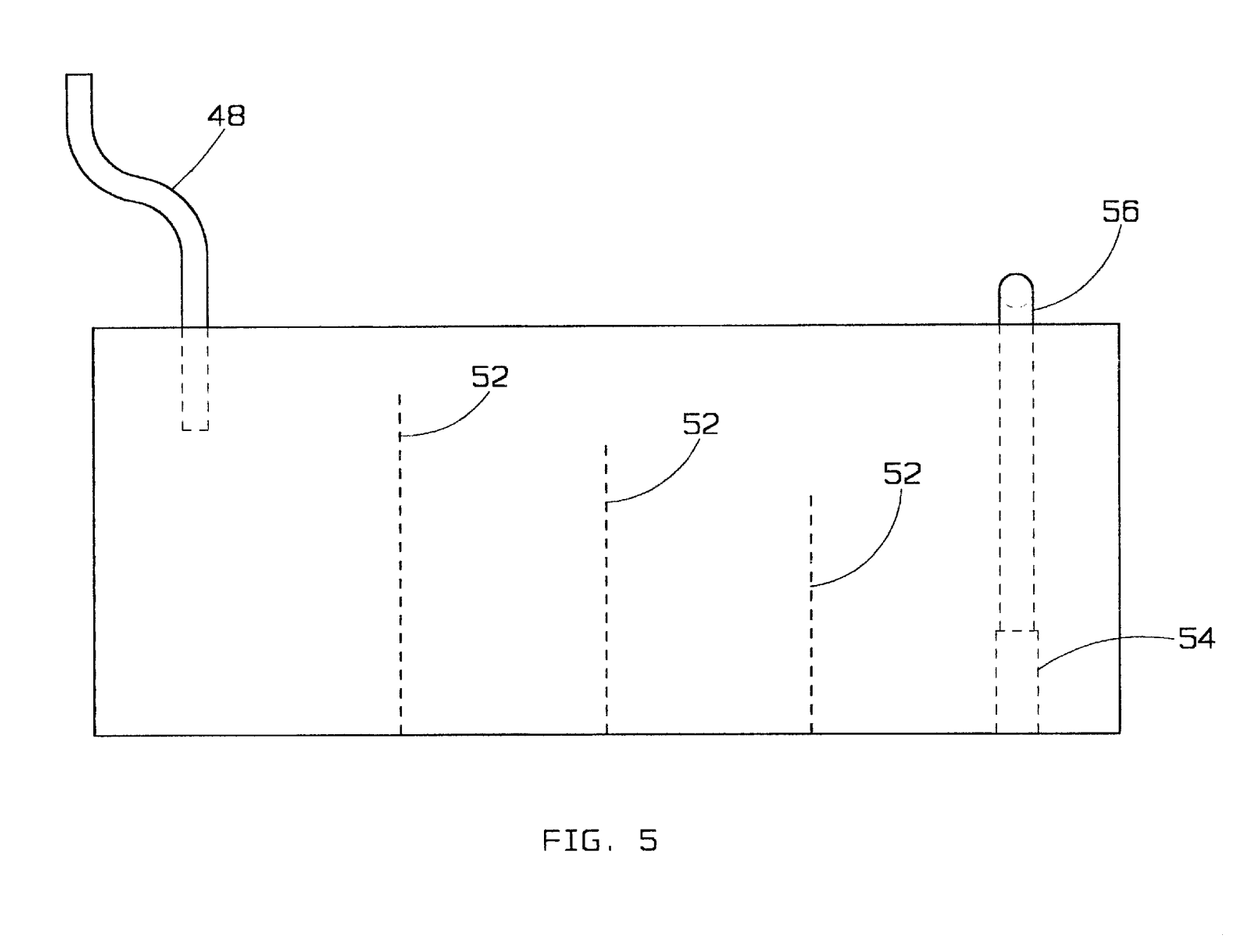
FIG. 5 is a side elevation of a settling tank according to the present invention.
Figure 6:
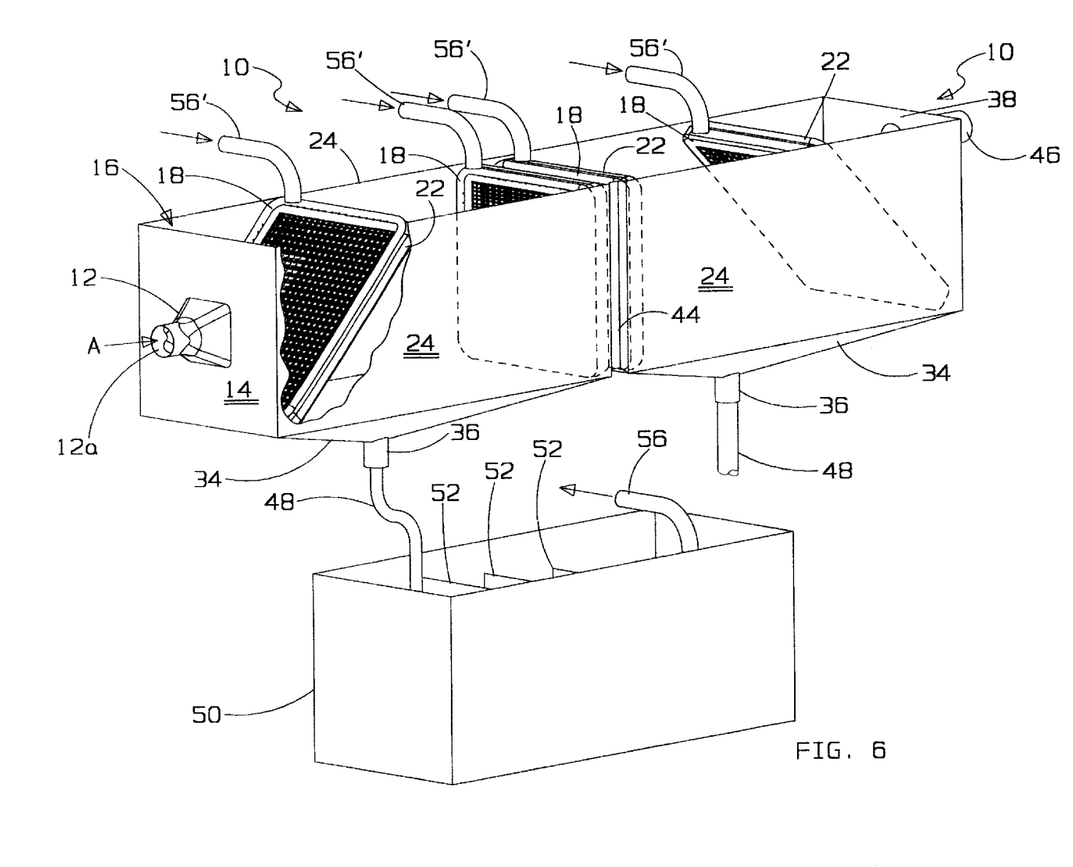

16. The device of claim 1 wherein said inlet is an airstream diffuser so as to slow said airstream upstream of said at least one water sprayer.

17. The device of claim 1 wherein said at least one water sprayer is spaced apart from said inlet so as to allow said airstream to slow in said at least one chamber upstream of said at least one water sprayer.

18. The device of claim 1 wherein said slurry remover is a drain in a floor of said at least one chamber.

19. The device of claim 18 further comprising a settling tank cooperation via a slurry conduit with said drain for settling particulate out of said slurry.

20. The device of claim 1 wherein said air mover is mounted inline with said flow path.

21. The device of claim 20 wherein said air mover is mounted adjacent said outlet.

22. The device of claim 21 wherein said air mover is an air reaction fan.

23. The device of claim 3 wherein said lattice includes a mesh mounted parallel and adjacent to said at least two parallel adjacent rigid grids.

24. The device of claim 23 wherein said mesh is upstream of said grids.

25. The device of claim 24 wherein said mesh has substantially uniformly sized apertures smaller than said effective grid spacing.

26. The device of claim 25 wherein said at least two parallel adjacent rigid grids are first and second grids, and wherein said mesh and said first and second grids are mounted within a supporting frame around perimeters thereof.

27. The device of claim 26 wherein said supporting frame extends from opposite sides of said at least one chambers.

28. The device of claim 27 wherein said at least one chamber is at least two chambers mounted so as to have airflow communication therebetween so that said flow path flows from an upstream chamber into downstream chambers from said inlet to said outlet.

29. The device of claim 28 wherein said at least two chambers are in-line and connected by a duct.

30. The device of claim 27 wherein each chamber of said at least one chamber contains a parallel spaced apart array of alternating said supporting frames and said at least one water sprayers.

31. The device of claim 30 wherein said alternating said supporting flames and said at least one water sprayers are arranged in closely adjacent pairs, one said supporting frame and one said at least one water sprayer per pair.

32. The device of claim 15 wherein said lattice includes a mesh mounted parallel and adjacent to said at least two parallel adjacent rigid grids.

33. The device of claim 32 wherein said mesh is upstream of said grids.

34. The device of claim 33 wherein said mesh has substantially uniformly sized apertures smaller than said effective grid spacing.

35. The device of claim 34 wherein said at least two parallel adjacent rigid grids are first and second grids, and wherein said mesh and said first and second grids are mounted within a supporting frame around perimeters thereof.

36. The device of claim 35 wherein said supporting frame extends from opposite sides of said at least one chamber.

37. The device of claim 36 wherein said at least one chamber is at least two chambers mounted so as to have airflow communication therebetween so that said flow path flows from an upstream chamber into downstream chambers from said inlet to said outlet.

38. The device of claim 37 wherein said at least two chambers are in-line and connected by a duct.

39. The device of claim 36 wherein each chamber of said at least one chamber contains a parallel spaced apart array of alternating said supporting frames and said at least one manifolds.

40. The device of claim 39 wherein said alternating said supporting frames and said manifolds are arranged in closely adjacent pairs, one said supporting frame and one said manifold per pair.

\* \* \* \* \*